April 7, 1970            LE ROY HART            3,504,906
RAPID CLAMP
Filed Oct. 20, 1967
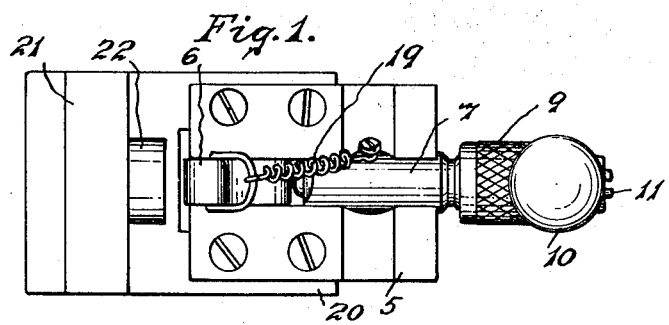
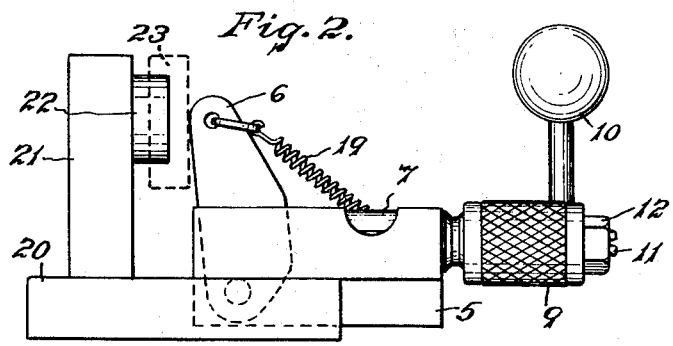
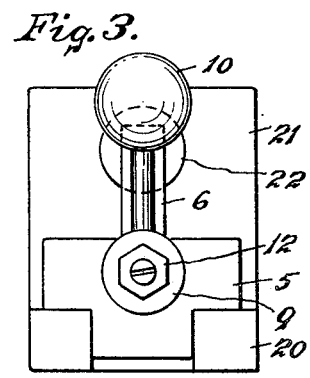
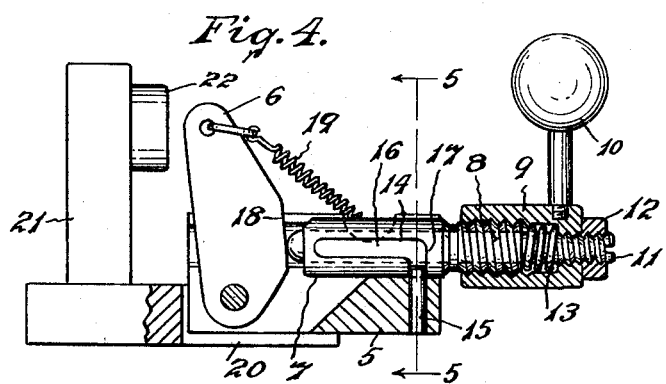
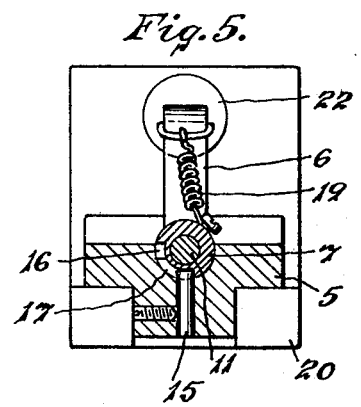
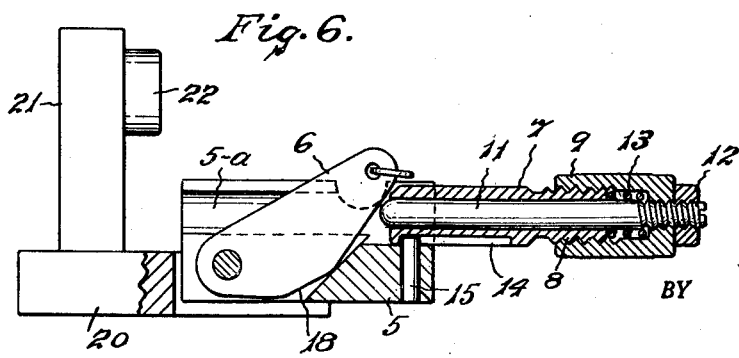
INVENTOR.
LE ROY HART:
BY
Louis V. Lucia
ATTORNEY.

United States Patent Office 3,504,906
Patented Apr. 7, 1970

3,504,906
RAPID CLAMP
Le Roy Hart, 50 Woodland St., Plainville, Conn. 06062
Filed Oct. 20, 1967, Ser. No. 682,706
Int. Cl. B25b 1/04, 5/04
U.S. Cl. 269—188    10 Claims

ABSTRACT OF THE DISCLOSURE

A rapid clamp, particularly of the type used for quickly clamping workpieces in position in a machine or fixture. Said clamp comprising generally a clamping unit which may be mounted in a desired location and comprises a rapid clamping mechanism which can be quickly brought into clamping position to accurately clamp a workpiece in a predetermined position and be quickly withdrawn from said clamping position to permit removal of the workpiece.

BACKGROUND OF THE INVENTION

Known rapid clamping devices have clamping mechanisms which are built in and form a permanent part of the device or fixture and it is highly desirable that a mechanism be provided in the form of a rapid clamping unit which can be readily installed as a unit in a desired position in a fixture, or the like.

SUMMARY OF THE INVENTION

In accordance with the present invention, a rapid clamping unit for a fixture, and the like, is provided which is highly efficient in its operation fo rapidly clamping workpieces and which is particularly adapted for use in high volume production.

The general object of the invention is to provide a rapid clamping mechanism in the form of a self contained unit which can be readily mounted for use in a clamping fixture and the like, or in a machine, to provide a rapid clamping mechanism therefor.

A further object of this invention is to provide a rapid clamping device and mechanism therefor in which a clamping member for clamping a workpiece in a desired position may be withdrawn into a normal position wherein said clamping member will not interfere with the placing of the workpiece in the clamping position and its removal therefrom.

A still further object is the provision of a rapid clamp which is easy to operate and simple in construction as clearly illustrated in the accompanying drawing.

BRIEF DESCRIPTION OF THE INVENTION

FIG. 1 is a plan view of my improved rapid clamp in clamping position.
FIG. 2 is a side view thereof.
FIG. 3 is a front view thereof.
FIG. 4 is a partly sectional side view thereof.
FIG. 5 is a sectional front view on line 5—5 of FIG. 4.
FIG. 6 is a partly sectional side view showing the clamp in its normal position.

DESCRIPTION OF THE INVENTION

As shown in the drawings a clamp embodying this invention may comprise a base member 5 of a clamping fixture in which there is pivotally mounted a clamping lever 6. The rapid clamping unit includes a sleeve 7 which is slideably and rotatably mounted in a recess 5-a in said base member and has a screw threaded end portion 8 to which there is threaded a clamping nut 9 having a handle 10 for rotating same. If desired, the said recess may be a simple hole in which the sleeve 7 is rotatably and slideably mounted. A clamping bar 11 is rotatable and axially slideable in said sleeve and has a threaded end portion threaded to the nut 9 and to a lock nut 12. A spring 13 is provided between the said clamping nut 9 and the sleeve 7 to provide friction for rotating the sleeve with the nut upon operation of the handle 10.

The said clamping sleeve is rotatably and slideably secured to the base member 5 by means of a retaining groove 14 in the outer surface of the sleeve and a locking pin 15 projecting from the base member into the groove; the said groove having a longitudinal straight portion 16 to permit longitudinal sliding movement of the sleeve and a lateral locking portion 17 which permits rotational movement of the sleeve into locking position.

In the clamping fixture shown in the drawings, the lever 6 has a cam surface 18 and the clamping bar 11 abuts said surface to force the lever into clamping position. A spring 19 is provided between said lever and sleeve 7 to bias the lever toward its normal position shown in FIG. 6.

As shown, the said clamping fixture is mounted in a base plate 20 having an upright support 21 with a suitable supporting member 22 to receive a workpiece 23 indicated in dotted lines.

In the operation of said rapid clamp, the same is first adjusted by placing a workpiece in position to be clamped on the supporting member 22, moving the clamping lever 6 into engagement with said workpiece by sliding the sleeve 7, rotating said sleeve to cause the pin 15 to enter the locking portion of the groove 14 and lock the sleeve in clamping position, and then adjusting the clamping bar 11 in the nut 9 to tighten the lever 6 against the workpiece as firmly as desired. The locking nut 12 is then tightened and the clamp is in adjusted condition for the particular workpiece to be clamped therein.

After it has been adjusted as above described, the clamp may be opened by simply operating the handle 10 to turn the lock nut counterclockwise whereby the said nut will rotate on the threaded portion 8 of the sleeve until the clamping lever is loosened, at which time the sleeve will rotate with the nut, due to the friction from the spring 13, until the pin 15 enters the longitudinal portion 18 of the groove 14 and the sleeve may then be withdrawn, pulling the lever 6 by means of the spring 19 to the normal position shown in FIG. 6, wherein it is out of the way and the workpiece may be easily removed from the clamp without interference.

When a workpiece is to be clamped, the sleeve 7 is simply slid forwardly from its normal position and rotated clockwise to the position clearly shown in FIGS. 4 and 5 wherein the pin 15 is in abutment with the end of the portion 17 of the groove 14. A slight further clockwise operation of the handle 10 will then rotate the nut 9 on threaded portion 8 of the sleeve and thus forcing the end of the clamping bar 11 against the cam surface 18 and tightening the clamping lever 6 against the workpiece.

It will be understood from the above description that the mechanism including the sleeve 7 and all the parts carried thereby form a self contained and complete rapid clamping unit which may be readily installed in any clamping fixture, machine or tool by simply providing a hole therein in the proper position with relation to a workpiece supporting surface, to receive said clamping unit, and the pin 15 to project into said hole and engage the groove 14.

I claim:
1. A rapid clamp including a base member and a rapid clamping unit slideably and rotatably mounted in said base member, said unit including a clamping sleeve having a threaded end portion, a clamping nut threaded to said end portion, a clamping bar adjustably secured to said nut, said bar being axially slideable and rotatable in said sleeve and projecting from the opposite end portion there- of, and means for locking said sleeve to said base member including a groove having a straight portion running lengthwise in the outer surface of said sleeve and an end portion extending laterally from said straight portion, and a locking pin in said base member portion projecting into said groove.

2. The subject matter set forth in claim 1 wherein a handle is provided on said clamping nut for rotating said nut and sleeve and sliding said clamping unit in the base member.

3. The subject matter set forth in claim 1 wherein a spring is provided between said sleeve and nut for frictionally rotating the sleeve with the nut.

4. For a rapid clamp including a base member, a rapid clamping unit comprising a sleeve insertable in a hole in said base member for rotating and sliding movement therein, a threaded end portion on said sleeve, a clamping nut threaded to said end portion, a clamping bar adjustably secured to said nut for axial adjustment and axially slideable and rotatable in said sleeve and projecting from the opposite end thereof, a spring between said sleeve and nut for frictionally rotating the sleeve with the nut, a retaining groove in the side of said sleeve having a straight portion running lengthwise thereof and a locking portion extending laterally from said straight portion partly around the sleeve, a locking pin in said base member extending into said groove, and a handle on said clamping nut for sliding the sleeve lengthwise in the base member to move the clamping bar to clamping position relatively to a workpiece, and to rotate said sleeve in one direction to move the locking portion of the groove into locking position with the locking pin to lock the sleeve against lengthwise movement and further rotate the nut to cause lengthwise movement of the clamping bar in the locked sleeve for forcing the end of said bar into clamping position, and to rotate said nut in the opposite direction to release the clamping bar from its clamping position and rotate the sleeve to release the locking portion of said groove from the locking pin and then axially retract said unit to its normal position.

5. The subject matter set forth in claim 4 wherein said clamping bar is threaded to said clamping nut for adjustment relatively thereto and means are provided for locking said bar to the nut in adjusted position.

6. A rapid clamp including a base member, a clamping lever pivotally mounted in said base member for clamping a workpiece against a supporting surface, a clamping sleeve slideable and rotatable in said base member, means for locking said sleeve in clamping position in said base member, a clamping nut threaded to said sleeve, and a clamping bar adjustably secured to said nut and rotatable and slideable in said sleeve and engageable with said lever whereby, when the sleeve is locked in clamping position and said nut is rotated on the sleeve, said clamping bar will force said clamping lever toward clamping position.

7. The subject matter set forth in claim 6 wherein said clamping bar projects from said sleeve to engage the clamping lever and is adjustable on the clamping nut to vary the distance that it projects therefrom.

8. The subject matter set forth in claim 6 wherein said clamping lever has a cam surface where it is engaged by the clamping bar.

9. The subject matter set forth in claim 6 including a spring between the clamping lever and clamping sleeve for biasing the lever toward the sleeve and into normal position when the sleeve is withdrawn from clamping position.

10. The subject matter set forth in claim 6 wherein said rapid clamp is mounted by its base member adjacent to a workpiece supporting surface and the clamping lever is moveable relatively to said surface to clamp a workpiece thereon and to release said workpiece and adapted to be withdrawn to a position out of the way of the workpiece.

References Cited
UNITED STATES PATENTS

| | | | |
|---|---|---|---|
| 3,428,306 | 2/1969 | Harrison | 269—218 |
| 1,445,344 | 2/1923 | Moltrup | 269—184 X |
| 500,039 | 6/1893 | Sherman | 269—150 X |

HAROLD D. WHITEHEAD, Primary Examiner

L. GILDEN, Assistant Examiner

U.S. Cl. X.R.

269—239